UNITED STATES PATENT OFFICE.

GEORGE L. COLLARD, OF SHARON, PENNSYLVANIA.

PREPARING ORE FOR BLAST-FURNACES.

1,129,645.  Specification of Letters Patent. Patented Feb. 23, 1915.

No Drawing.   Application filed April 22, 1914.   Serial No. 833,744.

*To all whom it may concern:*

Be it known that I, GEORGE L. COLLARD, residing at Sharon, in the county of Mercer and State of Pennsylvania, a citizen of the United States, have invented or discovered certain new and useful Improvements in Preparing Ore for Blast-Furnaces, of which improvements the following is a specification.

In reducing some kinds of ore, such as fine and sandy ore in blast furnaces, there is a considerable loss due to the finer particles of the ore being carried out by gases and deposited in the dust catchers and flues and subsequently known as flue dust. Many methods of preventing such loss, such as briqueting, nodulizing, or agglomerating this flue dust and also the sandy ore, have been suggested. These methods have objectionable features such as the cost of installing and operating plants suitable for economically treating a sufficient tonnage. And further the hematite ore ($Fe_2O_3$) is changed when treated as above mentioned into other combinations as $FeO$, $Fe_3O_4$, and possibly others, which cannot be as economically reduced as $Fe_2O_3$.

The invention described herein has for its object the formation of the flue dust or finely divided ore into a mass or body rendered strongly coherent by mixing therewith a material not different materially in chemical characteristics and physical subdivision from the flue dust or sandy ores.

In the practice of my invention the flue dust or sandy ores are mixed with what is known as plastic ores. These ores are found in many places as the old ranges of Lake Superior and also in the Mesaba region, and are as a rule comparatively high in alumina and combined and free water. It is believed by geologists that the plastic and cohesive or cementitious character is imparted to these ores by what is known as paint rock (a low grade of iron bearing material) being deposited with or carried by water into a deposit of higher grade ore. These plastic ores greatly resemble a comparatively stiff mud although there may be comparatively large lumps or pieces mixed with the finely divided ore, and can be molded or shaped by slight pressure in balls or other shaped masses, which will dry out gradually when charged into a blast furnace without crumbling or disintegrating until they reach the high temperature of the reducing zone. It has been found that the flue dust and sandy ores can be mixed in considerable quantities with the plastic ore without injuriously decreasing the coherence of the resultant mixture. If water be added a larger percentage of flue dust or sandy ore may be added.

While the mixing of the ores may be effected in any suitable manner by hand or mechanically, and the water added at any time or in any suitable manner, I have found that the best results are attained by mingling the ores in suitable proportions in the ore bins in the stock house and then injecting steam or water into the mingled ores. The moisture introduced in the mixture causes the sticky or cementitious element or portion of the plastic ores to pervade the whole mass rendering it strongly coherent. When the mixed materials are charged into the hoisting car they are more or less packed together into a lump, which of course is broken up more or less when dropped into the furnace, but these pieces will not crumble or disintegrate until they reach the reducing zone of the furnace.

I claim herein as my invention:

1. The method of preparing dry finely divided ore for charging into a blast furnace, which consists in mixing with such dry ore, a cohesive cementitious material not differing materially in the chemical characteristics of some of its elements from the dry, while such material is in its natural plastic or moist condition.

2. The method of preparing dry finely divided ore for charging into a blast furnace, which consists in mixing with such ore another finely divided cementitious ore while in its natural or moist condition.

3. The method of preparing dry finely divided ore for charging into a blast furnace, which consists in mixing such dry ore with a plastic ore while in its natural plastic or moist condition.

4. The method herein described of preparing dry finely divided ore which consists in mixing such ore with a natural cohesive cementitious material and not differing materially in the chemical characteristics of some of its elements from the dry ore and causing a dissemination of the cohesive cementitious elements through the mixture by injecting a fluid into the mass.

5. The method herein described of preparing dry finely divided ore for charging into a blast furnace which consists in mixing such ore with a natural plastic ore and injecting steam into the mixture.

In testimony whereof, I have hereunto set my hand.

GEORGE L. COLLARD.

Witnesses:
G. G. TRILL,
THOS. B. JOYCE.